United States Patent
Gerber et al.

(10) Patent No.: US 8,948,048 B2
(45) Date of Patent: Feb. 3, 2015

(54) METHOD AND APPARATUS FOR CHARACTERIZING INFRASTRUCTURE OF A CELLULAR NETWORK

(75) Inventors: Alexandre Gerber, Madison, NJ (US); Seungjoon Lee, Basking Ridge, NJ (US); Zhuoqing Mao, Ann Arbor, MI (US); Feng Qian, Ann Arbor, MI (US); Subhabrata Sen, New Providence, NJ (US); Zhaoguang Wang, Ann Arbor, MI (US); Qiang Xu, Ann Arbor, MI (US)

(73) Assignees: AT&T Intellectual Property I, L.P., Atlanta, GA (US); University of Michigan, Ann Arbor, MI (US)

(*) Notice: Subject to any disclaimer, the term of this patent is extended or adjusted under 35 U.S.C. 154(b) by 531 days.

(21) Appl. No.: 12/968,757

(22) Filed: Dec. 15, 2010

(65) Prior Publication Data

US 2012/0155319 A1 Jun. 21, 2012

(51) Int. Cl.
*H04L 12/28* (2006.01)
*H04L 12/16* (2006.01)
*H04L 1/00* (2006.01)
*G06F 3/033* (2013.01)
*H04W 24/08* (2009.01)
*H04L 29/12* (2006.01)

(52) U.S. Cl.
CPC .......... *H04W 24/08* (2013.01); *H04L 61/1511* (2013.01); *H04L 61/2514* (2013.01)
USPC ...... 370/254; 370/395.32; 370/261; 370/241; 370/252; 370/237; 455/130

(58) Field of Classification Search
CPC ....................................... H04L 41/12
USPC .................... 370/395.32, 261, 241, 252, 237; 455/130
See application file for complete search history.

(56) References Cited

U.S. PATENT DOCUMENTS

| | | | | |
|---|---|---|---|---|
| 6,937,572 | B1* | 8/2005 | Egan et al. | 370/252 |
| 7,035,230 | B1* | 4/2006 | Shaffer et al. | 370/261 |
| 2003/0067880 | A1* | 4/2003 | Chiruvolu | 370/237 |
| 2005/0130611 | A1* | 6/2005 | Lu et al. | 455/130 |
| 2008/0267193 | A1* | 10/2008 | Fought et al. | 370/395.32 |
| 2009/0245114 | A1* | 10/2009 | Vijayaraghavan | 370/241 |

* cited by examiner

*Primary Examiner* — Kiet Tang

(57) ABSTRACT

A method and apparatus for characterizing an infrastructure of a wireless network are disclosed. For example, the method obtains a first data set from a server log, and obtains a second data set from a plurality of wireless endpoint device. The method characterizes a parameter of the infrastructure of the wireless network using the first data set and the second data set and optimizes a network resource of the wireless network based on the parameter.

17 Claims, 3 Drawing Sheets

METHOD AND APPARATUS FOR CHARACTERIZING INFRASTRUCTURE OF A CELLULAR NETWORK

The present disclosure relates to a method for characterizing the infrastructure of a wireless network, e.g., a cellular network.

BACKGROUND

Despite the tremendous growth in the cellular data network usage due to the popularity of smart phones, there is rather limited understanding as to the underlying network infrastructure of various cellular carriers. Understanding the infrastructure characteristics of the cellular network such as the network topology, routing design, address allocation, and/or domain name system (DNS) service configuration will be beneficial for predicting, diagnosing, and improving cellular network services, as well as improving the delivery of contents to the growing population of wireless users.

SUMMARY

In one embodiment, the present disclosure teaches a method, computer readable medium and apparatus for characterizing an infrastructure of a wireless network. For example, the method obtains a first data set from a server log, and obtains a second data set from a plurality of wireless endpoint device. The method characterizes a parameter of the infrastructure of the wireless network using the first data set and the second data set and optimizes a network resource of the wireless network based on the parameter.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer readable medium and an apparatus for characterizing the infrastructure of a wireless network, e.g., a cellular network. In one embodiment, the present disclosure discloses a method for detecting at least one parameter of cellular infrastructure by combining several data sources, e.g., measurement results collected from end user devices, and server logs, e.g., logs from DNS servers and local search servers.

The present disclosure describes an analysis that was performed on a number of wireless carrier networks, e.g., four wireless carrier networks. It should be noted that the term "carrier" and "carrier network" are used interchangeably in the present disclosure. The results from the analysis are only illustrative in nature and are only provided to show how the data can be used in a novel manner to assist in the present method of characterizing the infrastructure of one or more wireless networks. As such, the data sets presented below are not to be interpreted as a limitation of the present disclosure.

Despite different technologies being adopted, a cellular data network is broadly divided into two parts, the radio access network and the core network. The radio access network may contain different infrastructures supporting 2G technology, e.g., General Packet Radio Service (GPRS), Enhanced Data rates for GSM Evolution (EDGE), and single carrier (1x) radio transmission technology (1xRTT), and 3G technology, e.g., universal mobile telecommunication system (UMTS) and Evolution Data Only/Evolution Data Optimized (EV-DO) system, respectively. In one embodiment, the structure of the core network does not differentiate 2G technology with 3G technology. So a single core network is compatible with both 2G technology and 3G technology. Several cellular network architectures will now be briefly described to provide the context of the present disclosure. It should be noted that the present disclosure is not limited to any particular type of cellular data network.

Figure 1:
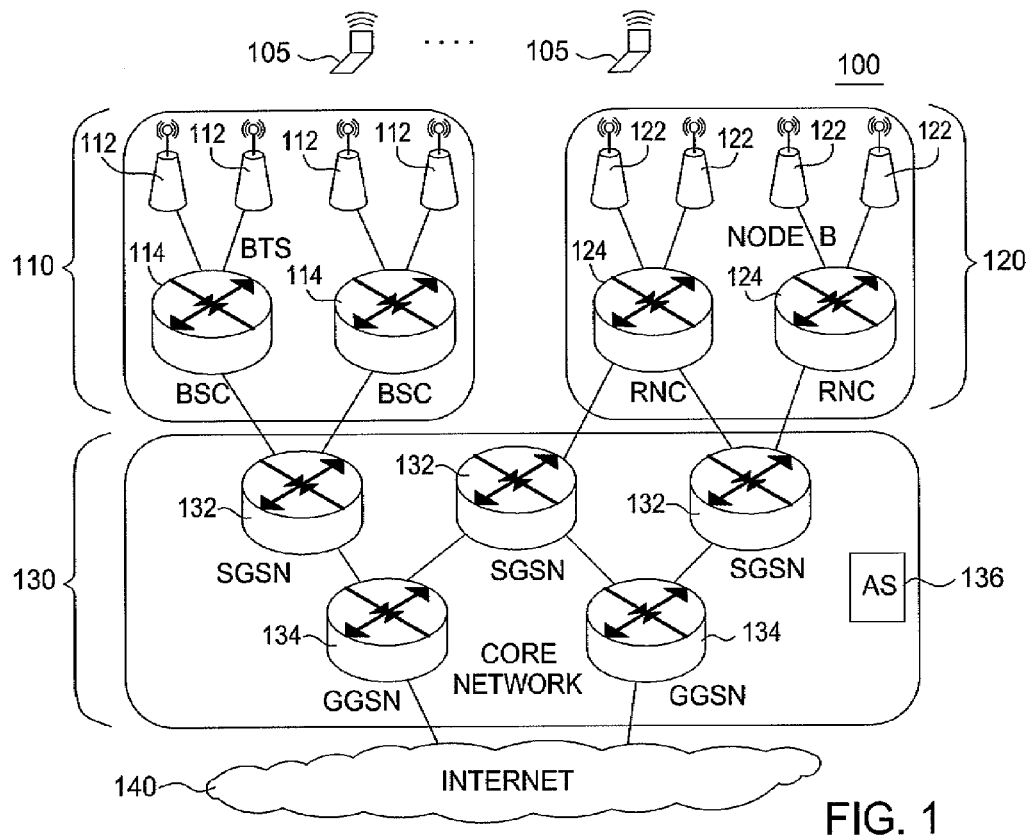
FIG. 1 illustrates one example of a cellular network architecture.

FIG. 1 shows a typical UMTS data network architecture 100. The radio access network 110 is comprised of Base Transceiver Stations (BTS) 112, Base Station Controllers (BSC) for 2G technology, whereas radio access network 120 is compromised of NodeBs 122, Radio Network Controllers (RNC) 124 for 3G technology. The core network 130 comprises of Serving GPRS Support Nodes (SGSN) 132 and Gateway GPRS Support Nodes (GGSN) 134. The SGSN has a logical connection to the wireless user endpoint device 105. When a user endpoint device 105 connects to a cellular data network, the device first communicates with its local SGSN that will inform other GGSNs of the user's access point name (APN). Which GGSN serves the user is decided according to the user's APN. The SGSN converts the mobile data into IP packets and send them to the GGSN through a tunneling protocol. The GGSN serves as the gateway between the cellular core network and the external network e.g., Internet 140. The GGSN is the first visible IP hop in the path from the user to the Internet. All the traffic between the cellular data network and the Internet goes through the GGSN. The core network is also illustrated with an application server 136 for implementing the method of the present disclosure for characterizing the infrastructure of a wireless network, e.g., a cellular network. It should be noted that the application server 136 can be deployed external to the core network as well.

Figure 2:
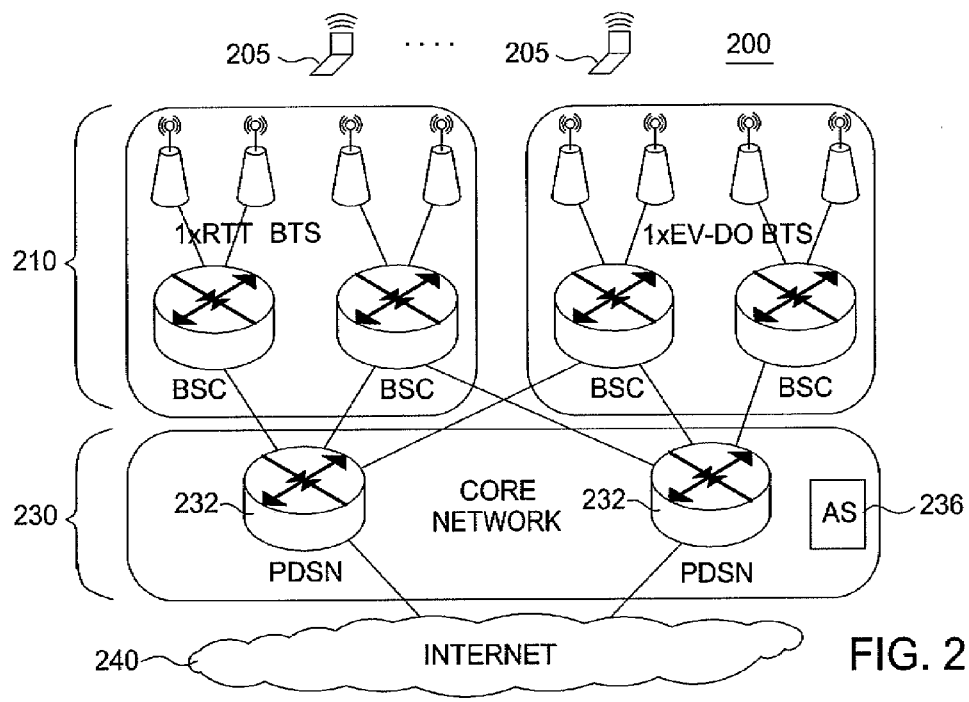
FIG. 2 illustrates another example of a cellular network architecture.

Similarly, FIG. 2 shows a typical architecture of the EV-DO data network architecture 200. The radio access network 210 contains 1xRTT BTS, 1xEV-DO BTS, and BSC, which is similar to the UMTS network for interacting with a plurality of wireless endpoint devices 205. While the core network 230 is simpler than that of the UMTS network. The Packet Data Serving Node (PDSN) 232 serves similar functions of both SGSN and GGSN and the cellular data goes through the PDSN into the Internet 240. Similarly, the core network 230 is also illustrated with an application server 236 for implementing the method of the present disclosure for characterizing the infrastructure of a wireless network, e.g., a cellular network. It should be noted that the application server 236 can be deployed external to the core network as well. It is noteworthy that both UMTS network and EV-DO network follow a hierarchical architecture. The method of the present disclosure for discovering a parameter of the network structure of a wireless network is applicable to both types of the network. Without explicit explanation, any statements pertaining to the UMTS network are applicable to the EV-DO network as well.

Cellular data networks are not well explored despite the growing number of users. The impact of the architecture of such cellular networks on the performance of a diverse set of network applications, e.g., on smart phones and for mobile users has been overlooked. For example, it has been noted that Internet Protocol (IP) addresses can be shared across geographically disjointed regions while close in time. This observation suggests that there may be very few IP gateways for cellular data networks, and that the access aggregation point, IP gateway, and IP address management are much more centralized than those for wireline networks, where tens or hundreds of Point of Presences (PoPs) are spread out at the IP layer. The fact that the same IP prefixes may cover a large geographic area makes content delivery and other IP address based network functionality much less efficient.

Understanding the architecture of cellular data networks is beneficial for future improvement, and provides insights on designing new services, applications, and protocols. This also helps influence the design of next-generation cellular data networks. The challenge of understanding cellular data networks which are in fact IP-based, is exacerbated by the lack of openness of such networks. For example, merely sending "traceroute" probes (a tool for showing the route that a packet takes) to relevant IP addresses exposes mostly private IP addresses along the paths within an UMTS architecture. In one embodiment, the present disclosure discloses a method for characterizing the infrastructure of a wireless network by using data collected from two distinct sources. The method provides a systematic approach for processing the data to reconcile potential conflicts, combined with other data obtained via a probing and passive data analysis.

In brief, the present method performs four broad steps, 1) cellular prefix identification, 2) clustering based on geo-locality, 3) finding the location of the GGSN (or Internet gateway) for each cluster, and 4) optimal cache placement for a content distribution network (CDN). It should be noted that the logs from a local search server are named as "DataSource1" (or broadly first data set) and the measurement results from the end-users as "DataSource2" (or broadly second data set). Each of the steps is now described briefly with a more detailed description provided further below.

In one embodiment, cellular prefix identification determines whether a prefix from DataSource1 is from the cellular network or not, and which cellular carrier it is from if it is a cellular prefix. One reason behind the identification of cellular address blocks and associated mobile carrier names is: 1) to build a prefix-to-carrier table from DataSource2 so that one can know the carrier of each observed prefix as reported from the mobile phone OS, and 2) then from DataSource1, one can simply use the prefix of the IP address to look up the carrier name in the prefix-to-carrier table. It is noted that inferring a cellular carrier by using "whois" to get the network name is ad hoc and insufficient.

In one embodiment, to understand the network structure of the cellular core networks, one can perform clustering on prefixes of DataSource1 to group them into similar geographic network locations from which one can further understand the routing behavior. These clusters will represent the geographic areas covered by each cellular data centers, where cellular IP addresses are managed and assigned. To cluster the prefixes and compare the similarity of their geographic coverage, one can use bisect k-means algorithm which can automatically determine the number of clusters with only input parameter of maximum tolerable sum of squared error (SSE).

In one embodiment, once each cluster is identified, one can use "traceroute" or use active probing to find the location of the GGSN (or Internet gateway) for each cluster. In one embodiment, once the location of the GGSN (or Internet gateway) for each cluster has been identified, the present method can optimize the location/deployment or configuration of the caches or servers of the content distribution network. Each of the four (4) steps will now be described in greater details.

For example, the first challenge is the identification of relevant cellular network address blocks, along with their geographic and topological location. In one embodiment, the method can apply location based clustering to group address blocks with similar geo-locality to characterize the overall infrastructure. The method deploys a measurement software on an endpoint device, e.g., a user smart phone device, thereby providing significant visibility into the network experience of smart phone users. Combining this data source with that from a content provider supporting local searches for wireless users enhances the present method's visibility into the cellular network infrastructure. It should be noted that by using local search results, the present method is able to acquire the location of the user, i.e., a subscriber. In other words, by using the server logs that contain the location of the subscriber and the IP address assigned, the method is able to correlate the location of the user.

In one embodiment, the present disclosure provides a measurement methodology for characterizing the cellular network infrastructure which requires detecting the relevant address blocks, locating them, and clustering them based on the geographic areas that they cover. This enables the identification of the data centers within the cellular data networks covering the first visible outbound IP layer hop and the gateways traversed to reach the rest of the Internet. It is also of particular interest to be able to discern the boundary between the Internet and the cellular network for applications such as locating the bottleneck link along a path traversing the radio access network, cellular backbone and Internet IP backbone, and then its access link.

Figure 3:
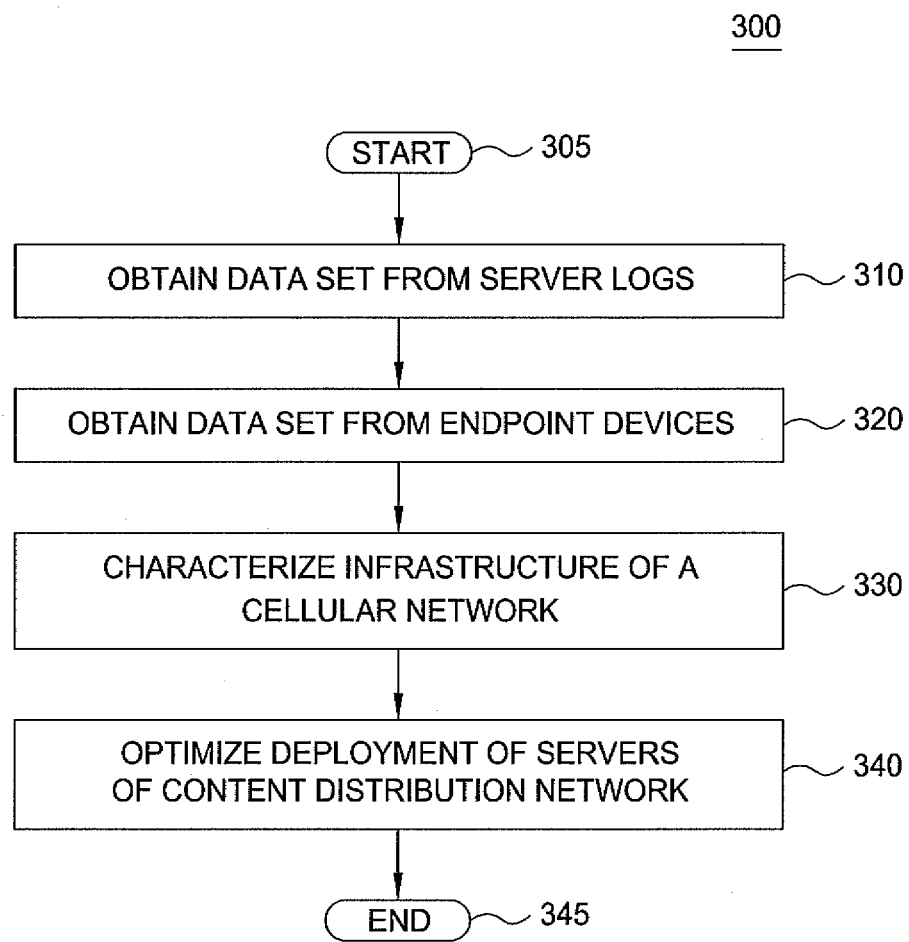
FIG. 3 illustrates a high level flowchart of one embodiment of a method for characterizing the infrastructure of a wireless network.

FIG. 3 illustrates a high level flowchart of one embodiment of a method 300 for characterizing the infrastructure of a wireless network. For example, method 300 can be implemented in an application server 136 or 236 as discussed in FIGS. 1 and 2 or a general purpose computer as disclosed in FIG. 4. Method 300 starts in step 305 and proceeds to step 310.

In step 310, method 300 obtains a first data set (e.g., referred to as "DataSource1") from server logs. In one embodiment, the first data set is from server logs of a wireless application that provides local searches. For example, the logs may contain the IP address, timestamp, and the Global Positioning System (GPS) location of the endpoint device. In one embodiment, the subscriber identification and the search requests are not part of the data set. The data set may range over a period of time, e.g., a week, a month, several months and so on. For example, Table 1 below provides an illustrative example of a first data set comprising data collected over several months, containing several million records. This illustrative data set covers 16,439 BGP prefixes, 121,567 "/24" address blocks from 1,862 autonomous system (AS) numbers. It should be noted that users of the wireless application may also use Wi-Fi besides cellular networks to access the service. It should be noted that Table 1 is only illustrative and should not be interpreted to limit the scope of the present disclosure.

TABLE 1

| Carrier | Records (%) | # BGP prefixes | #/24 prefixes | # ASNs |
|---|---|---|---|---|
| A | 43.34% | 54 | 16,287 | 1 |
| B | 7.09% | 12 | 41 | 1 |
| C | 1.51% | 163 | 13,901 | 2 |
| D | 1.22% | 129 | 15,315 | 1 |
| * | 100% | 16,439 | 121,567 | 1.82 |

Table 1 shows the breakdown of the records among four (4) wireless carriers for the first data set. More than 40% of all the records observed are mapped to one carrier due to the disproportionate popularity of the service among different mobile users. The number of BGP prefixes and /24 prefixes are computed to estimate the address space size of each carrier, showing Carrier A with the most addresses assigned: about 4.2 million IP addresses. This shows an address space shortage issue that were found to be dealt with by using network address translation (NAT)-like solutions of assigning private addresses by several carriers. Note that also some mobile carrier, e.g., Carrier C corresponds to more than one AS number (ASN).

Returning to FIG. 3, method 300 obtains a second data set from wireless endpoint devices, e.g., cell phones, smart phones, etc. In one embodiment, the second data set comes from an application that was deployed on the wireless endpoint devices, e.g., on popular smart phone platforms: e.g., iPhone OS, Android, and Windows Mobile (WM). The application can be downloaded to the wireless endpoint device for the purpose of evaluating and diagnosing the users' networks from which the present method can collect network characteristics such as IP address, carrier name, DNS IP address, and trace route paths from the phone to the server. Note that this method of collecting data provides some ground truths for certain data, e.g., IP addresses that are associated with cellular networks instead of Internet end-points via Wi-Fi network access can be differentiated because of the API offered by some phones. An example of this second set of data is provided in Table 2. Again, it should be noted that Table 2 is only illustrative and should not be interpreted to limit the scope of the present disclosure.

TABLE 2

| Platform | # users | # carriers | # BGP prefixes | #/24 prefixes | # ASNs |
|---|---|---|---|---|---|
| iPhone OS | 39K | — | 5.2(2.8)K | 10.8(2.8)K | 1.2K(268) |
| Android | 42K | 278(36) | 2.7(1.1)K | 7.3(3.1)K | 720(179) |
| WM | 16K | 516(66) | 1.6(0.5)K | 5.7(3.5)K | 545(121) |
| * | 98K | 571(87) | 7.6(2.9)K | 23(9.3)K | 1.5K(387) |

Referring to Table 2, it should be noted that on the iPhone OS, one cannot identify the connecting carrier. Furthermore, the numbers inside the parenthesis (xx) refers to U.S. users only.

The data in Table 2 is obtained over several months. Given that the application from which the data is obtained is used globally, a much larger number of carriers were observed many of which are outside the U.S. This allows the present method to confirm whether some of the observations noted in the first data set are applicable for non-U.S. users and mobile carriers.

One aspect of the present method is the use of multiple data sources to resolve conflicts and to improve the accuracy of the analysis. This is necessary as each data source alone may have certain limitations and is often insufficient to provide conclusive information.

In one embodiment, the two data sets are compared based on prefixes and records, showing that about half of the ASes seen in the first data set contain all prefixes seen in the second data set. Given the independence properties of the two data sets, this overlap provides confidence that the data are fairly representative of actual cellular data user population in the U.S. The remaining ones not present in the second data set could be either Internet users or users who did not use the application.

To understand the coverage of the two data sources, one can compare them directly. In one embodiment, it was noted that the first data set covers a more diverse data set in terms of both ASes as well as prefixes, partly because non-cellular users (e.g., wireless users running application from their devices on Wi-Fi) also may contribute to the records in the server logs. It was also noted that the second data source (e.g., referred to as "DataSource2") however also consists of many cellular users not residing in the U.S. due to the nature of the application. One can take advantage of the unique properties of both data sets, where the first data set serves as the main data for analysis and the second data set is used for cross validation.

Returning to FIG. 3, method 300 in step 330 characterizes at least one parameter of the infrastructure of a cellular network. In one embodiment, the method 300 first differentiates cellular addresses and mobile carrier names. For example, it is assumed that cellular network address blocks are distinct from Internet wired host IP address ranges due to the ease of management. It is conceivable that because of address space shortage, dynamic reallocation of address ranges is performed, especially for mobile hosts or Dynamic Host Configuration Protocol (DHCP) clients that do not need stable IP addresses to prevent the exhaustion of address blocks at a particular network location. However, to share address blocks across distinct network locations requires announcing Border Gateway Protocol (BGP) routing updates to modify the routes for incoming traffic, thereby affecting routing behavior globally. Due to the added overhead, management complexity and associated routing disruption, the present disclosure assumes that this to be done in practice and thus assumes that a longest matching prefix is either assigned to cellular users or Internet users.

It should be noted that both data sources directly provide the IP address information; however, those IP addresses may not always be associated with cellular users because smart phones could connect via Wi-Fi networks to access the network service for the first data set or execute the measurement application for second data set. Thus, in one embodiment, the method 300 attempts to identify the cellular addresses and their associated carrier names. The latter can be inferred based on the organization name of the origin AS number associated with the longest matching prefix for the IP in question. But this method is not always accurate, due to a lack of one-to-one mapping from the AS organization name to the carrier name. For example, some carrier may partner with several networks from distinct organizations to offer cellular network service. Thus, the IP addresses in the data sets are first mapped into their longest matching prefixes from a collection of prefixes obtained from routing table data of Route-Views.

The overall idea behind the identification of cellular address blocks and associated mobile carrier names from the two data sources is the following: first, build a prefix-to-carrier table from the second data set so that one can know the carrier of each observed prefix as reported from the mobile phone OS; then from the first data set, one can simply use the prefix of the IP address to look up the carrier name in the prefix-to-carrier table. Note that inferring carrier by using "whois" to get the network name is ad hoc and insufficient. The challenge is that the carrier name information from second data set may not always be trustworthy, due to numerous smart phone vendors using OSes such as Android and Windows Mobile, resulting in potential implementation bugs. However, one can cross-validate across phone platforms to obtain accurate carrier information.

In one embodiment, the second data set contains the network type, i.e., cellular vs. Wi-Fi as reported by application programming interfaces (APIs) provided by the OS based on the state of the network interfaces on the three platforms. However, the carrier name is only available on Android and Windows Mobile due to the API limitation on iPhone OS. After mapping IP addresses to the longest matching BGP prefixes, one can build a mapping table from BGP prefix to carrier names for Android and Windows Mobile separately. Although one cannot have a prefix-to-carrier table from iPhone OS, one can produce a Wi-Fi-prefix list containing all the prefixes reported as Wi-Fi by the second data set, which can be used to validate the two prefix-to-carrier tables. Such prefixes are associated with the public IP of the edge network, likely a digital subscriber line (DSL) or cable modem IP in the case of home users. Because there are only limited device types using iPhone OS, i.e., iPhone 3G, iPhone 3GS, and iPod Touch, the iPhone OS's Wi-Fi-prefix list should be accurate.

To test the accuracy of the prefix-to-carrier tables, one can validate using the Wi-Fi-prefix list. Given a prefix-to-carrier table, one can compare it with the Wi-Fi-prefix list to detect any potential conflicts, i.e., a case when a prefix in the prefix-to-carrier table appears in the Wi-Fi-prefix list as well. A conflict happens only if the IP addresses in a BGP prefix is considered as a Wi-Fi address by the second data set on the iPhone OS but listed as a cellular address on Android or Windows Mobile. By comparison, several hundred conflicts were observed for Windows Mobile's table, yet there were no conflict for Android. The reason may be that the second data set on Windows Mobile failed to provide the network type on some platforms since Microsoft customizes the Windows Mobile OS for each type of phone individually. Therefore, one can use Android's prefix-to-carrier table to assign the carrier name to each record in the first data set.

Table 1 shows that among the remaining unmapped records, 36.83% of all the records come from an AS of a communication company (confirmed with "who is"). No single prefix originated from this AS is confirmed to be a cellular prefix using the technique disclosed above. Further confirmation using publicly available address registry information from "arin" shows that this service provider provides a special navigation service for mobile users. Another large unmapped AS is a DSL network, all prefixes from this AS are not included in the prefix-to-carrier table, which further confirms the cellular prefix identification methodology.

It is noted that there are only a few known mobile carriers in the U.S., and several well-known ones in other continents. To generalize the observation from the limited data sets as discussed above, it is possible to predict whether an IP address is cellular IP and its associated mobile carrier. It is also useful to identify comprehensively most if not all the cellular prefixes associated with specific carriers. Identifying whether an IP address is cellular IP is beneficial for both resource management and security applications.

In one embodiment, one can make use of the address structure information to predict carrier and cellular address information. Note that it would be beneficial to understand whether a single AS is allocated in its entirety for cellular network purposes, i.e., all prefixes originated with that AS number are used for mobile cell users. It has been found that for some carriers, they specifically have ASes whose names have key words such as "wireless" and "mobility", thereby indicating that with high probability all prefixes announced by them are allocated for mobile services. In the data sets discussed above, no AS announcing prefixes were observed for both mobile cellular users as well as Internet users. Note that this simple heuristic of AS based cellular address space identification may not hold in the future due to address space shortage, but it does have the advantage of operational management ease. It is conceivably a good operational practice to allocate ASes specifically for mobile services to keep them distinct from addresses for other Internet services.

Using data from the second data set, one can observe that some users from different countries and even different continents share the same carrier. However, the public IP addresses in different countries are different, as are their AS numbers. This indicates that even for the same carrier, they may have different sub-networks for different countries. The present disclosure also considered roaming behavior. In the second data set, it was found that several users running the application in different countries across distinct continents (North America vs. Europe) while still sharing the same /24 IP prefix. This indicates that the traffic from a device is still routed back to its home network even when it is outside the country. When users roam outside their home networks, the outgoing traffic will be routed from the local networks back to the users' home networks before reaching the Internet. Similarly, traffic from the Internet to mobile users goes through home networks first and then routes to the foreign local networks before reaching the users. This design eases management and billing; however, the routing is quite inefficient and may incur high latency.

As such, the method 300 characterizes the properties of the cellular infrastructure along several dimensions. First, the method 300 characterizes the address structure and the cellular network topology at the data center or PoP level, followed by an analysis of the dynamics of the address structure. Given the importance of local DNS server configuration on user performance, the method then investigates as to how this setup varies across carriers and demonstrates any predictable patterns. Finally, the method examines the routing behavior of address prefixes associated with cellular users.

In one embodiment, method 300 performs IP address and topology analysis. To understand the network structure of the cellular core networks, the method performs "clustering" to group IP addresses into similar geographic network locations from which one can further understand the routing behavior. These clusters will represent the geographic areas covered by each cellular data centers, where cellular IP addresses are managed and assigned.

On the Internet, an IP address can often provide a good indication of geolocation, albeit perhaps only at a coarse grained level. However, for cellular networks, the geo-locality is rather uncertain due to a lack of clear association of IP addresses with physical network locations, especially given the observed highly dynamic nature of IP addresses assigned to a mobile device. In one embodiment, GPS information from the first data set is used to study the geo-locality of cellular IP addresses. The second data set is not used as it has a much smaller coverage and is only used for validation. By assigning IP addresses to prefixes, one can identify the occurrence of a prefix at different physical locations based on the GPS information in the data sets.

It has been observed across prefixes, that similarity exists in terms of its geolocation coverage. It may be surprising that a single prefix can be observed at so many different locations, clearly illustrating that the geolocation properties of cellular addresses differ significantly from Internet addresses. The location coverage of different BGP prefixes is generally different, which is influenced by the population density as well as user density for the particular network service the data originates from. The present method attempts to capture similarity in geographic coverage through clustering to better understand the underlying network structure.

In one embodiment, to systematically study the similarity of geographic coverage, one can split the contiguous region of the U.S. into grids, e.g., which are squares with 5 degrees of latitude and 5 degrees of longitude. Given a prefix, one can count its number of appearances within each grid. As a result, for each prefix, one can generate a vector in which each element records the number of presence of that prefix inside a particular grid. For example, the number of dimensions for these vectors can be 55 in one study. For each carrier, one can generate a vector in the same way.

In one embodiment, the method first uses this vector to calculate the entropy of each prefix. To get the entropy, the method normalizes the vector based on its carrier's vector. The normalized vector can be considered as the probability distribution function (PDF) of the prefix's presences across locations with the prior knowledge of the PDF of its carrier's presences across the U.S. For each prefix, one can get the Shannon entropy based on its normalized vector. For example, if a prefix evenly appears across the U.S., its entropy should be $\log_2 55 = 5.8$, in which 55 is the number of grids.

After using the entropy to infer the existence of geo-locality, the method normalizes the original vector by this prefix's total number of occurrences within all grids for consistent comparison across prefixes. This vector is used as the feature vector to study the geo-similarity (the similarity in geographic coverage) across prefixes. To compare the similarity and cluster prefixes, one can use the bisect k-means algorithm which can automatically determine the number of clusters with only one input parameter of maximum tolerable SSE (Sum of Squared Error).

In one embodiment, the method first considers using /24 address blocks for clustering which is more fine-grained than BGP prefixes. One can check whether the wireless carriers aggregate internal routes when they advertise the external BGP routes. If that was the case, the number of clusters of /24 prefix clustering should be larger than the number of BGP prefix clustering.

To study the sensitivity of the threshold setting for filtering /24 prefixes, one can vary the thresholds, and analyze the number of clusters generated. Given a threshold value, one can exclude prefixes with the number of records fewer than the threshold before clustering. To avoid being aggressive, one can set a minimum threshold on a percentage of number of records for each cluster. In one embodiment, one can set the minimum threshold to be 1%. It is believed that this will satisfy the lower-bound of the cluster's volume since a cluster should serve a large geographic area of the U.S.

Selecting the right threshold for pre-filtering ensures no excessive number of clusters with very few prefixes. However, the cluster quality is also determined by the similarity of prefixes within a cluster as measured by SSE, the only input to the clustering algorithm. Basically, in each cluster, SSE is the average distance from each feature vector to the centroid of the cluster. Smaller values of SSE generate more clusters. In one embodiment, one can vary the choice of SSE from 0.01 to 0.99 with an increment of 0.01. Since there may be multiple stable number of clusters, one can select the one with the longest range of SSE. For example, the number of clusters for Carrier B is 5 because it covers the range from [0.1, 0.67], which is longer than any other ranges. In one embodiment, one can make similar tradeoffs for clustering at the BGP prefix granularity. It should be noted that each cluster consists of prefixes with similar geo-locality.

The following observations are made in performing clustering. First, it appears that the four carriers studied appear to cover the entire U.S. with only a handful of data centers (e.g., 4-8), differing significantly from the Internet backbone design. Since GGSN is the first IP hop from the mobile device, this network structure implies that content delivery services cannot get content very close to end users, as each cluster clearly covers many different locations, thereby also implying the sharing of address blocks across these locations. Second, one single location often appears in more than one cluster. For example, some popular locations can belong to two clusters. Not only are there only a few clusters, but there are clearly cases where traffic from users are routed through clusters far away instead of the closest one. It is believed that this is due to SGSNs performing load balancing of traffic across GGSNs in different data centers. Third, there appears to be many "outlier" cases with sparse presence for each cluster in addition to consistent load balancing patterns. It is believed that this is caused by limited choice of GGSNs for a small set of devices that use a special set of APNs to which not all GGSNs are available for use. Fourth, the geo-locality for /24 address blocks is the same location as that for the BGP prefixes, thereby confirming that there is no internal route aggregation performed by these cellular IP data networks.

In one embodiment, method 300 can validate geo-clustering by using "traceroute". For example, the geo-clusters that are created should correspond to the prefixes that serve clients within the same set of geographic regions. In one embodiment, one can use "traceroute" to further validate the geo-locality of each cluster generated from bisect k-means. For example, for each prefix of the carriers in the first data set, one can run "traceroute" on various "PlanetLab" nodes (where "PlanetLab" is a group of computers that is available as a test bed for computer networking and distributed systems research) at geographically very different locations within U.S. The following observations were noted in one illustrative analysis:

i) Stability of "traceroute" paths at the IP level: All "traceroute" paths obtained from the analysis are found to be very stable with no changes at DNS or IP level.

ii) Stability of trace route paths at the prefix level: To the same prefix, the last 5 visible hops in the "traceroute" path from different PlanetLab nodes are consistently the same.

iii) Similarity of "traceroute" paths to prefixes in the same cluster: For some carriers, prefixes in the same bisect k-means cluster share the same "traceroute" path (at DNS or IP level) validating their geographic proximity. However, for other carriers, each prefix has a distinct "traceroute" path, thereby making validation more challenging.

iv) Location correlation of "traceroute" paths and the cluster's region: For some carriers, for some clusters one can infer the correlation between their trace route path and their location; while for others there is insufficient information to determine router locations. For example, one can infer the city and state information from the DNS name of the hops along the path.

In one embodiment, method 300 can validate geo-clustering by using the second data set. Although the size of the second data set is far smaller than that of the first data set, one can still use the second data set to validate the clustering results on the first data set. In one embodiment, one can repeat the clustering on the prefixes which has many records from the second data set. In one analysis, the clustering results are consistent with those of the first data set. Moreover, the observations from the first data set consistently apply to the second data set, e.g., the geographic locations covered by a cluster do not always appear to be contiguous; one single location may appear in more than one clusters; outliers exist, etc.

In one embodiment, method 300 can characterize the dynamics of IP address assignment to mobile devices, the stability of the identified geo-clusters, and also the location stability of user load assigned to a geo-cluster for a given prefix. In one embodiment, the method can run the second data set application on the endpoint devices continuously for a data collection period of time, thereby providing the data necessary to study the dynamics of IP assignment. Several analyses are provided below to illustrate the dynamics of IP assignment of various carriers.

For Carrier A, it was found that public IP address changes most frequently. For example, within several minutes, the public IP address may change at /24 prefix level within the same /16 prefix. However, across hours, the public IP address can change across /16 prefixes and sometimes can even change across /8 prefixes. Another observation for Carrier A is that the device has private IP address which changes less frequently (~60% of the time) than public IP address.

For Carrier B, it was found that the device has both public IP address and private IP address. However, unlike Carrier A, during the data collection period, no change for either address was observed. So Carrier B has a more stable IP address assignment policy than Carrier A.

For Carrier C and D, the device's local IP address is the same as its public IP address. Although it was observed that the IP changes over time, the change is at a much lower frequency when compared to Carrier A's. The average stable period for each IP is more than two hours.

For Carrier A, it was found that a /8 prefix was assigned to mobile users which can in theory support at least 16 million users simultaneously. There are also other prefixes observed for Carrier A, which uses NAT-like techniques to share each public IP across multiple users. However, the frequency of public IP changes for Carrier A is quite high compared to other carriers studied.

For Carriers C and D, each user's local IP address is a public IP address, so they may not be able to support many concurrent users. Based on BGP announcements using data from Route Views, both Carrier C and D are assigned BGP prefixes covering e.g., 10 to 30 millions IP addresses. Then, one can exclude the BGP prefixes that are never observed in the data set and it was found that Carrier C uses 81.3% of the announced IP space while for Carrier D 75.4%. Thus, the unobserved IP ranges may have not been used yet although announced. Thus, the above discussion provides various analyses that provide insights into the IP address assignment policy of the various carriers.

In one embodiment, method 300 can characterize geo-cluster stability. Although clustering was found to be stable across the several months of the first data set, traffic distribution may not be stable across areas, particularly where multiple clusters are overlapping. It has been observed that traffic does shift across BGP prefixes that overlap in geographic coverage. For example, one can monitor the ratio of traffic volume each prefix contributes to a carrier's traffic.

In one embodiment, method 300 can characterize user load stability. For example, the method 300 examines the user load stability of a carrier network, which is novel since the method is focusing on the granularity of BGP prefix level. For each prefix remaining after the pre-filtering in geo-clustering, the method counts its number of records falling into each hour across weekdays and the variance of the number of records. For example, it has been observed that the average user load for two BGP prefixes of Carrier A changes over Eastern Standard Time. For example, in one observation there was a clear three-hour shift of user load from a BGP prefix 11 to the BGP prefix 12, which is a strong evidence that BGP prefix 11 lies on a eastern region and BGP prefix 12 lies on a western region. This indication validates an earlier geo-clustering result that indicates BGP prefix 11 belongs to a cluster covering the east coast, while BGP prefix 12 is from a cluster serving the west coast.

In one embodiment, method 300 can characterize configuration of local DNS server. The configuration of local DNS infrastructure is essential to ensure good network performance, given that DNS lookup occurs frequently for any kind of Web-based applications. Besides the performance improvement, local DNS information is often used for directing clients to the nearest cache server expected to have the best performance. This is based on the key assumption that clients tend to be close to their configured local DNS servers, which may not always hold true. In one embodiment, the method 300 examines the geo-locality of the local DNS servers relative to the cellular users and the implication of the local DNS configuration of cellular users on content delivery.

In order to collect as diverse of a set of local DNS server configurations as possible, one can utilize the second data set application by making the client send a specialized DNS request for a DNS name that embeds the device identifier and timestamp to a domain for which the present method has access to the server log of the authoritative DNS servers. The device identifier is used for correlating the corresponding entry in the server log which stores information such as the device's public IP address. The timestamp ensures that the request is globally unique so that it is not cached.

In one embodiment, the relationship among the local DNS IPs, smart phone's public IPs, and private IPs are analyzed. This includes data both from the specialized DNS request as well as from the second data set through the deployed application. It has been noted that DNS servers can be in a different BGP prefix compared to their local clients. However, the DNS server and public address of its client are observed always having the same AS number and thus belong to the same mobile carrier.

It should be noted that different carriers appear to have different policies for configuring local DNS servers. For example, for Carrier A, all local DNS servers of users across the country belong to a /19 address block. Although the public IP addresses of the same device using Carrier A change very frequently, often within several minutes, while its private IPs changing slightly less frequently, the local DNS server IP for the same device is always stable. It has also been observed that there is some location based proximity between devices and the local DNS IPs for Carrier A. For example, it was observed that users within 500 km radius share the same DNS IP but not with users farther away. This observation suggests that using the local DNS IP as a metric for CDN servers to perform content selection for Carrier A users can be reasonably accurate.

In another analysis, it was observed that for Carrier B there are only four distinct DNS IP addresses within two different /24 prefixes. It is noted that DNS IPs in the same /24 prefix are equally likely to appear; however, one /24 prefix occurs six times more likely. Unlike Carrier A, devices using Carrier B seldom change public or private IP addresses. For Carrier C and D, it was observed that the device's local IP address is always the same as its public address, which changes over time for a given device, but less frequently compared with Carrier A. For carrier C, only a single DNS server IP was observed. For Carrier D, four DNS server IP addresses were found within the same /24 prefix, each with equal probability of being used, likely due to a round-robin like load-balancing policy.

To understand how these DNS servers differ from their counterparts on the Internet, various properties were identified. Firstly, these DNS servers did not respond to Ping requests. Secondly, the DNS names of these IPs, if they exist, indicate they are for cellular networks. Thirdly, all except Carrier D's servers ignore arbitrary DNS requests and thus impose access control to allow local cellular users only. An absence of such access control can render local DNS servers vulnerable to DoS attacks or abuse for reflector based DDoS attacks.

To further understand how the correlation between DNS server IP address and the device's physical locations can be harnessed to improve content selection, one can cluster users based on their DNS server IP address without any other knowledge. In one embodiment, the result indicates that geo-locality of users shares the same DNS server. Users sharing the same DNS server IP address belong to the same public IP prefix based cluster, serving as another independent validation for geo-clustering. It was also found that DNS based clustering produces clusters that can correspond to the same public IP prefix based cluster. This is expected as load-balancing is applied across DNS servers, thereby resulting in one GGSN being associated with multiple DNS IPs. Since traffic of each user needs to route through the corresponding GGSN node, the best content selection decision is limited at the level of the GGSN. Finer-grained content selection will not achieve better performance due to this limitation. Thus, using the knowledge of the user's local DNS server IP, the content provider can infer the associated GGSN for this user and make optimal content selection accordingly.

In one embodiment, method 300 can characterize routing behavior of the carrier's network. Routing stability is an essential measure of network performance. In one embodiment, the method investigates whether prefixes assigned to cellular users have any inherent differences in their dynamic routing behavior compared to the rest of the Internet prefixes.

In one embodiment, the method uses "traceroute" to characterize the routing behavior at the IP level to study routing stability and path similarity across paths from prefixes within the same clusters as well across clusters. As discussed before, "traceroute" effectively validates our geo-clustering results for several carriers.

For example, for Carrier A, one can use the second data set containing users across the U.S. and probe using "traceroute" from their devices to a central server that is accessible by the present method. The first hop often times out. For the same user at different time, the "traceroute" paths are quite stable. Using another device, it has been noted that the second, third, fifth, seventh hops do not change across days, while other hops vary within the same /24 prefix with the similar DNS names. This indicates that despite the frequent change in the public IP addresses of Carrier A, the routing path for a specific user is quite stable.

In one embodiment, one can use "traceroute" to characterize the paths from the central server to both the public IP address of a device and its corresponding DNS server IP address. The similarity of the paths will confirm that the local DNS server seems to be located close to the location where the path has to be traversed by all cellular traffic destined to the client, i.e., the clusters of GGSNs in the data centers. It endorses the previous discussions on DNS server based clustering for Carrier A.

In one embodiment, the method characterizes BGP routing update. One can study AS-level path diversity for cellular networks by examining the AS paths observed in BGP routing updates.

Returning to FIG. 3, once the method has characterized one or more parameters of the infrastructure of a cellular network, the method proceeds to step 340. In step 340, the method 300 can use the parameters of the infrastructure of a cellular network to optimize the deployment of caches or servers of a content distribution network to reduce latency for network traffic. For example, based on the information obtained from the characterization of the cellular network, the method 300 can provide one or more recommendations as to the utilization, re-configuration, upgrade, provisioning and/or deployment (e.g., deployment of a new network resource) of caches/servers of a content distribution network. For example, a cache or server of a content distribution network can be re-configured (e.g., receiving a new configuration), activated (e.g., turned on in support of a detected congestion condition) and/or re-deployed (e.g., to a different location) based on the one or more recommendations.

To illustrate, content placement and routing (CDN) plays an important role of reducing the delay for Web users. The essential idea behind CDN is to serve users from nearby CDN servers which replicate the content from origin server which may be far away from the users. However, in cellular networks, CDN does not work as well. Take UMTS as an example, since all traffic is routed through a GGSN, no matter how close to the CDN server a user is, the content still traverses a GGSN before reaching the end-user. Thus, without support to place CDN servers inside cellular core networks, placing them close to the GGSNs is the optimal solution available, and this solution is clearly limited due to the current constraint where each GGSN node is serving a wide area of users and often being quite far away from its users. However, as the cellular network is updated or changed, the present method can be used to characterize the changes, where it may lead to improvement in content placement and routing in the future, i.e., optimizing the deployment of caches/servers of a content distribution network to better reduce latency for network traffic.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 4:
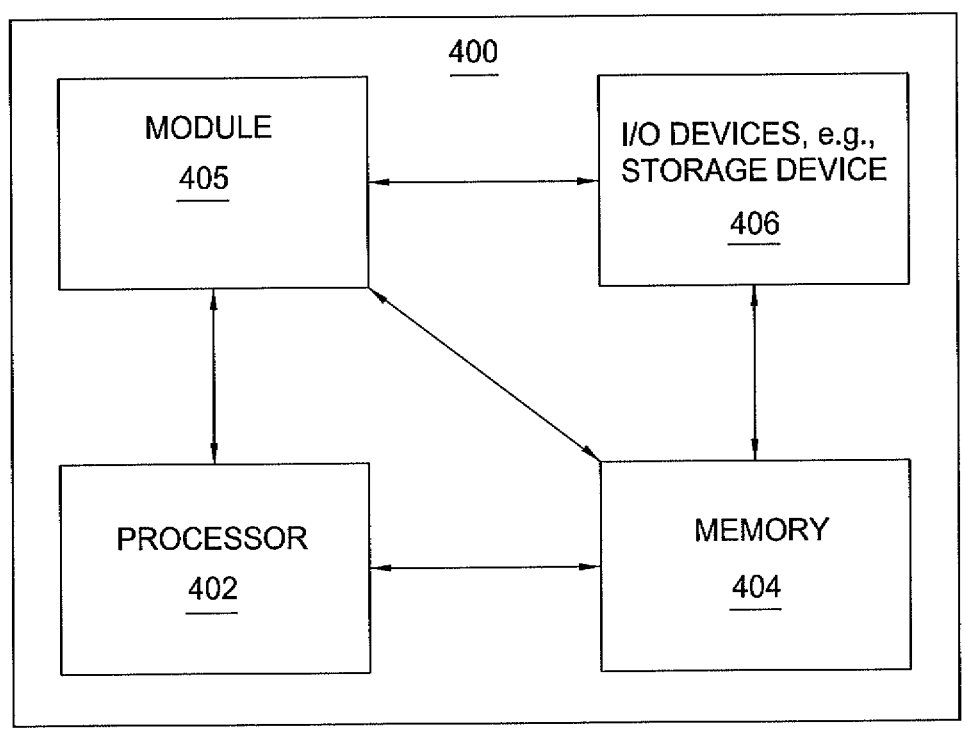
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for characterizing the infrastructure of a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for characterizing the infrastructure of a wireless network can be loaded into memory 404 and executed by processor 402 to implement the functions as discussed above. As such, the present method 405 for characterizing the infrastructure of a wireless network (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for characterizing an infrastructure of a wireless network, comprising:
   obtaining, by a processor, a first data set from a server log of a search server;
   obtaining, by the processor, a second data set from a plurality of wireless endpoint devices;
   characterizing, by the processor, a parameter of the infrastructure of the wireless network using the first data set and the second data set, wherein the parameter comprises a location of a gateway in the wireless network that provides an access to a public network from the wireless network, wherein the wireless network comprises a cellular network, wherein the characterizing the parameter comprises predicting cellular addresses of the cellular network; and
   optimizing, by the processor, a network resource of a content distribution network based on the parameter.

2. The method of claim 1, wherein the server log relates to local search results that correlate to a location of a subscriber.

3. The method of claim 1, wherein the second data set is generated by an application residing in each of the plurality of wireless endpoint devices.

4. The method of claim 1, wherein the characterizing the parameter comprises identifying a geo-locality of the cellular addresses.

5. The method of claim 4, wherein the identifying the geo-locality of the cellular addresses comprises performing a geo-clustering of the cellular addresses.

6. The method of claim 5, wherein the identifying the geo-locality of the cellular addresses comprises validating the geo-clustering of the cellular addresses.

7. The method of claim 6, wherein the identifying the geo-locality of the cellular addresses further comprises determining a stability of the geo-clustering.

8. The method of claim 1, wherein the characterizing the parameter comprises identifying internet protocol address assignments of the cellular network.

9. The method of claim 1, wherein the characterizing the parameter comprises determining a stability of user load.

10. The method of claim 1, wherein the characterizing the parameter comprises determining a geo-locality of a domain name system server relative to a wireless endpoint device.

11. The method of claim 1, wherein the characterizing the parameter comprises determining a routing stability of the cellular network.

12. The method of claim 1, wherein the optimizing the network resource comprises reconfiguring the network resource.

13. The method of claim 1, wherein the optimizing the network resource comprises activating the network resource.

14. The method of claim 1, wherein the optimizing the network resource comprises deploying the network resource.

15. The method of claim 1, wherein the optimizing the network resource comprises providing a recommendation as to a usage of the network resource.

16. A non-transitory computer-readable medium storing instructions which, when executed by a processor, cause the processor to perform operations for characterizing an infrastructure of a wireless network, the operations comprising:
   obtaining a first data set from a server log of a search server;
   obtaining a second data set from a plurality of wireless endpoint devices;
   characterizing a parameter of the infrastructure of the wireless network using the first data set and the second data set, wherein the parameter comprises a location of a gateway in the wireless network that provides access to a public network from the wireless network, wherein the wireless network comprises a cellular network, wherein the characterizing the parameter comprises predicting cellular addresses of the cellular network; and
   optimizing a network resource of a content distribution network based on the parameter.

17. An apparatus for characterizing an infrastructure of a wireless network, comprising:
   a processor; and
   a computer-readable medium storing instructions which, when executed by the processor, cause the processor to perform operations, the operations comprising:
      obtaining a first data set from a server log of a search server;
      obtaining a second data set from a plurality of wireless endpoint devices;
      characterizing a parameter of the infrastructure of the wireless network using the first data set and the second data set, wherein the parameter comprises a location of a gateway in the wireless network that provides access to a public network from the wireless network, wherein the wireless network comprises a cellular network, wherein the characterizing the parameter comprises predicting cellular addresses of the cellular network; and
      optimizing a network resource of a content distribution network based on the parameter.

* * * * *